(12) United States Patent
Grant

(10) Patent No.: US 8,554,676 B2
(45) Date of Patent: *Oct. 8, 2013

(54) PURCHASING ALERT METHODS AND APPARATUS

(71) Applicant: The Toronto-Dominion Bank, Mississauga (CA)

(72) Inventor: David S. Grant, Mission Viejo, CA (US)

(73) Assignee: The Toronto-Dominion Bank, Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/654,789

(22) Filed: Oct. 18, 2012

(65) Prior Publication Data

US 2013/0046688 A1  Feb. 21, 2013

Related U.S. Application Data

(63) Continuation of application No. 11/572,413, filed as application No. PCT/US2005/032068 on Sep. 9, 2005, now Pat. No. 8,311,941.

(60) Provisional application No. 60/609,591, filed on Sep. 13, 2004.

(51) Int. Cl.
*G06Q 40/00* (2012.01)

(52) U.S. Cl.
USPC .............................................. 705/40; 705/35

(58) Field of Classification Search
USPC ..................................................... 705/35, 40
See application file for complete search history.

(56) References Cited

U.S. PATENT DOCUMENTS

| 5,615,110 | A | 3/1997 | Wong |
|---|---|---|---|
| 5,708,422 | A * | 1/1998 | Blonder et al. ............... 340/5.41 |
| 6,105,006 | A | 8/2000 | Davis et al. |
| 6,832,721 | B2 | 12/2004 | Fujii |
| 7,039,611 | B2 | 5/2006 | Devine |
| 7,357,310 | B2 | 4/2008 | Calabrese et al. |
| 2002/0004770 | A1* | 1/2002 | Phillips et al. .................. 705/34 |
| 2002/0133462 | A1 | 9/2002 | Shteyn |
| 2004/0049454 | A1 | 3/2004 | Kanno et al. |
| 2004/0059671 | A1 | 3/2004 | Nozaki et al. |

(Continued)

FOREIGN PATENT DOCUMENTS

| EP | 1067492 | 1/2001 |
|---|---|---|
| JP | 2002/42034 | 2/2002 |

(Continued)

OTHER PUBLICATIONS

EFT Report; "Congress Decries Bank Violations of Terror Financing Laws"; V8, n12, Jun. 9, 2004. ISSN: 0195-7287.*

(Continued)

*Primary Examiner* — Edward Chang

(57) ABSTRACT

Systems and techniques for receiving transaction information at an authentication system. The transaction information may be processed using different rule sets, based on the financial instrument used for the transaction (for example, a particular credit card, debit card, bank account, brokerage account, and the like). One or more alerts may be generated and communicated to the user. The alerts may be formatted based on user device configuration information, such as a cell phone type, email type, and the like.

29 Claims, 3 Drawing Sheets

(56) References Cited

U.S. PATENT DOCUMENTS

| | | | |
|---|---|---|---|
| 2004/0064406 A1 | 4/2004 | Yates et al. | |
| 2004/0068472 A1 | 4/2004 | Sahota et al. | |
| 2004/0083184 A1 | 4/2004 | Tsuei et al. | |
| 2004/0103049 A1 | 5/2004 | Kerr | |
| 2006/0059110 A1 | 3/2006 | Madhok et al. | |
| 2006/0123092 A1 | 6/2006 | Madams et al. | |
| 2006/0282528 A1 | 12/2006 | Madams et al. | |
| 2007/0011261 A1 | 1/2007 | Madams et al. | |
| 2007/0143230 A1* | 6/2007 | Narainsamy et al. | 705/75 |
| 2008/0167990 A1 | 7/2008 | Grant | |

FOREIGN PATENT DOCUMENTS

| | | |
|---|---|---|
| JP | 2002/175485 | 6/2002 |
| JP | 2003/16371 | 1/2003 |
| JP | 2003/223598 | 8/2003 |
| WO | 02/23412 | 3/2002 |
| WO | 03/001422 | 1/2003 |

OTHER PUBLICATIONS

Allen, Doug; "Forum Systems 'XWall Web Services Firewall"; Network Magazine, 22, Apr. 1, 2004; ISSN: 1093-8001.*

Business Wire; "Spains Bancaja Savings Bank Protects Cardholers Form Fraud with Software from ACI Worldwide-Bancaja Licenses ACI Proactive Risk Manager to monitor Debit Card Trnasactions for Fraud"; May 7, 2003.*

EFT Report. Congress Decries Bank Violations of Terror Financing Laws. V28. N12. Jun. 9, 2004. pp. 1-5. ISSN. 1095-7287.

Allen, Doug. Forum systems XWall Web Services Firewall. Network Magazine. Apr. 22, 2004. pp. 1-3. ISSN. 1093-8001.

Business Wire. Spain's Bancaja Saving Bank Projects Cardholders from Fraud with Software from ACI Worldwide-Bancaja Licenses ACI Proactive Risk Manager to Monitor Debit Card Transactions for Fraud. May 7, 2003. pp.

Notification of Transmittal of the International Search Report and the Written Opinion of the International Searching Authority (1 page).

International Search Report (2 pages).

Written Opinion of the International Searching Authority (3 pages).

* cited by examiner

PURCHASING ALERT METHODS AND APPARATUS

RELATED APPLICATIONS

This patent application is a continuation of U.S. patent application Ser. No. 11/572,413 filed Jan. 19, 2007, which is a national stage application of International Patent Application No. PCT/US2005/032068, filed Sep. 9, 2005, and claims the benefit of the filing date of U.S. Provisional Patent Application No. 60/609,591 filed Sep. 13, 2004. The entire contents of such applications are incorporated herein by reference.

FIELD

This patent application generally relates to financial transactions, more particularly to communication of financial transaction information.

BACKGROUND

The growth in credit card and online transaction use has been accompanied by a substantial growth in fraud and identity theft. For example, storage of credit card information on electronic information systems can enable large-scale credit card fraud.

Another common form of fraud is increasing the charge after the consumer has agreed to the fee or amount. For example, a small amount is added to a restaurant bill, service bill, or other transaction. Since consumers generally do not see the actual charges until their credit card statements arrive, this type of fraud is difficult to detect.

A number of systems are available to reduce the damage that may be caused by credit card fraud. For example, many financial institutions offer customers the ability to monitor their credit and other accounts by electronically accessing their accounts. Customers may then notify the financial institution if any improper transactions are noted.

Although consumers may increase their financial security using available systems, they may not provide optimal, efficient fraud mitigation.

SUMMARY

In one aspect, this disclosure relates to a method that involves receiving transaction information for N financial transactions, each financial transaction having already been executed using an associated financial instrument. The method also involves processing the transaction information using at least one of a plurality of rule sets, selectively generating M alert communications in response to the processing, and passing the alert communications to an entity over a network.

Preferably, each rule set is associated with a respective one of the financial instruments, each alert communication identifies one of the N financial transactions, and M is less than N. Further, preferably the receiving, processing, generating, and passing are performed by a transaction alert system after the N financial transactions have already been executed and without interfering with execution of the N financial transactions.

The method also involves receiving at least one response message from the entity at a response system in direct reply to the alert communications. The response messages from the entity include designations provided by the entity concerning the financial transactions. Preferably the execution of the financial transactions are not conditioned on the designations included in the response messages.

In another aspect, this disclosure relates to a method that involves receiving M alert communications at a device, wherein (i) the alert communications identify N financial transactions, (ii) the M alert communications are received in response to a rule-based process performed on transaction information associated with the N financial transactions, and (iii) the rule-based process uses a plurality of rule sets associated with a plurality of financial instruments to selectively generate the M alert communications. Preferably, each financial transaction has already been executed using a respective one of the financial instruments, and M is less than N.

The method also involves receiving input from the entity in response to the M alert communications, and generating at least one response message in direct reply to the M alert communications based on the input. The response messages from the entity include designations provided by the entity concerning the financial transactions. Preferably, execution of the financial transactions are not conditioned on the designations included in the response messages, and the method is performed by one or more processors configured to execute software instructions which, when executed by the one or more processors, cause the device to perform the method after the financial transactions have already been executed and without interfering with the execution of the financial transactions.

In other aspects, this disclosure relates to systems and and/or hardware to perform the foregoing methods.

BRIEF DESCRIPTION OF THE DRAWINGS

The foregoing aspects of this disclosure will now be described, by way of example, with reference to the accompanying drawings, in which.

Like reference symbols in the various drawings indicate like elements.

DETAILED DESCRIPTION

Systems and techniques provided herein may allow for time-efficient and responsive monitoring of financial transaction information. Rather than providing information on an institution-by-institution basis, the current disclosure allows for rules-based analysis of transaction information from a number of different institutions. Additionally, transactions need not be verified before completion; instead, a user is given the flexibility to determine how transactions with different profiles are handled.

As noted above, a number of available techniques may be used to reduce fraud in financial transactions. However, the available techniques all fall short in that they provide piecemeal protection, rather than an efficient system for alerting consumers to transactions that affect their finances.

Figure 1:
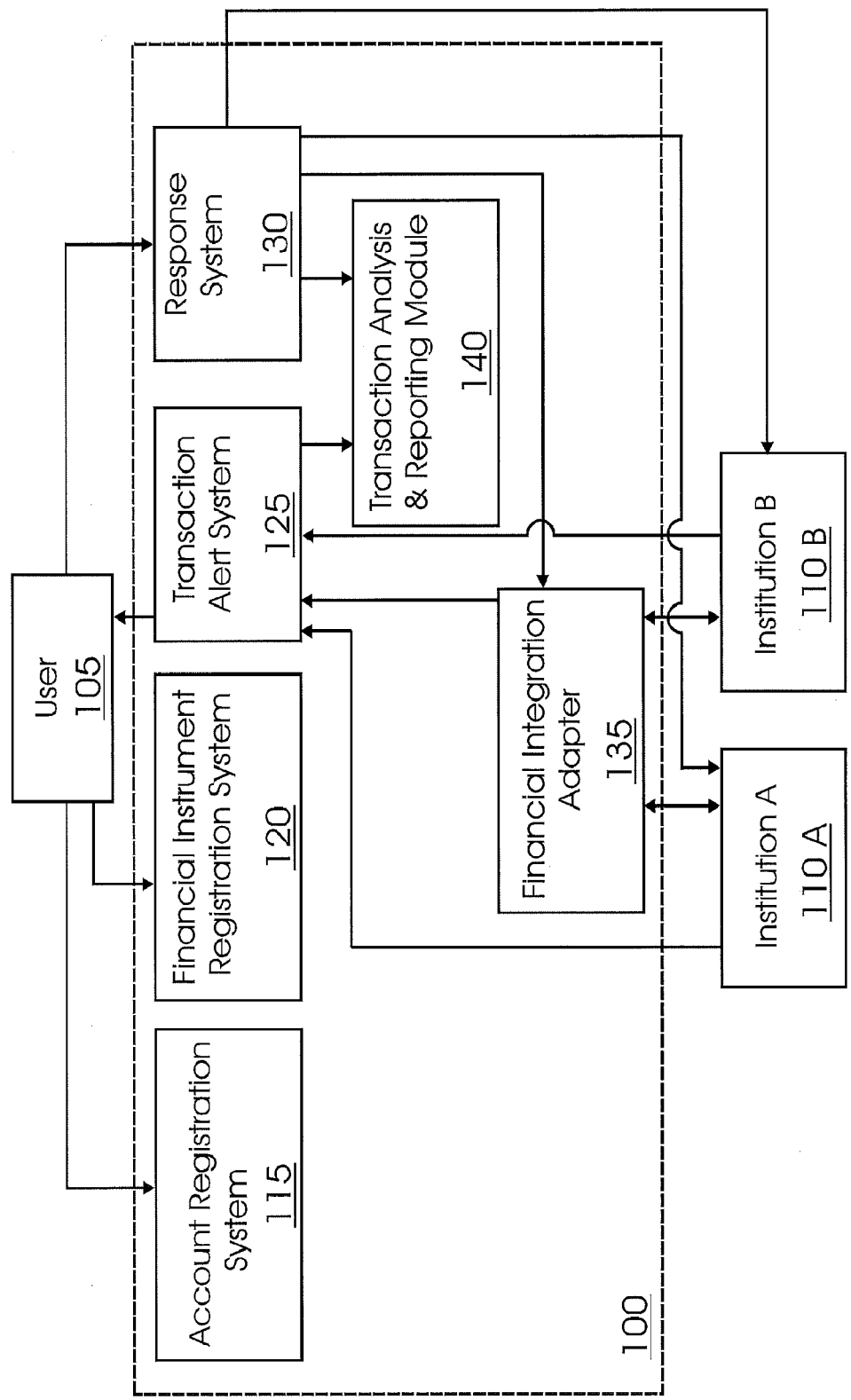
FIG. 1 is a diagram of a secure transaction system.

FIG. 1 shows a diagram of a security and authentication system 100 that may provide user-tailored financial transaction information quickly and reliably. Rather than providing transaction information on an institution by institution basis, system 100 enables a user 105 to obtain transaction information from a plurality of different financial institutions such as institution 110A and 110B.

System 100 includes an account registration system 115, and a financial instrument registration system 120. User 105 enrolls in system 100 using account registration system 115.

For example, user 105 creates a user identifier and password, and provides profile information to account registration system 115.

In some embodiments, the profile information includes configuration information for the personal information systems on which the user will receive alerts. For example, the configuration may include information about the particular cell phone on which alerts will be received. Different cell phone types may process, display, and/or transmit information differently. By acquiring information indicative of the type of cell phone being used, system 100 can format alerts tailored to the type of cell phone, and can process responses from the cell phone efficiently.

In another example, the user may provide configuration information for an email system to be used for receiving alerts and/or generating responses. The user may indicate whether the email system is an IMAP system, VIM system, a POP system, or other type of email system. In response, system 100 can format alerts and/or process responses accordingly. Users may provide this configuration information by typing information in a text field, by selecting a cell phone type, email type, or other configuration from a menu such as a drop down menu, or in another manner (e.g., a setup email or text message exchange between the user device and system 100).

Once user 105 is enrolled in system 100, user 105 registers financial instruments using a financial instrument registration system 120. Typically, today's consumers have a number of financial instruments such as credit cards, debit cards, automatic teller machine cards, bank accounts, brokerage accounts, and the like. A user's financial instruments are frequently distributed among a number of different financial institutions. As noted above, this may make transaction monitoring difficult and impractical. System 100 may provide for simple, real-time monitoring of a user's financial instruments.

To begin the financial instrument registration process, user 105 may provide financial institution information for institutions 110A and 110B, and identifier information for a plurality of financial instruments at institutions 110A and 110B.

For example, institution 110A may be a bank, and institution 110B may be a brokerage. User 105 may provide bank information, such as a name, address, ABA transit/routing number, and the like for institution 110A. User 105 may provide account information for institution 110A, such as one or more credit card numbers, account numbers, and the like. For institution 110B, user 105 may provide identifying information for the particular brokerage, as well as account information.

Financial instrument registration system 120 may process the information for institutions 110A and 110B to validate each financial instrument registered, either during the registration process or as part of an initial setup process. The validation may use existing networks such as credit card processors before the particular financial instrument is associated with user 105, and data associated with the financial instrument is stored.

User 105 may also select rules for handling particular transactions, either as part of an initial enrollment process, or at some other point. For example, user 105 may define rules for particular financial instruments, for particular types of transactions, for particular vendors (or other transaction participants), and/or other types of rules (such as geographical rules). Rule definition and application are discussed more fully below.

In operation, system 100 may receive transaction information from institution 110A and institution 110B, and provide the transaction information to user 105 using a transaction alert system 125, described below. The transaction information may be provided in the form of an alert, notifying the user that a transaction has occurred, and including relevant details about the transaction.

In some implementations, system 100 includes a financial integration adapter 135. Financial integration adapter 135 may be implemented, for example, at least partially on a server (or in another manner) at financial institution 110A and/or 110B, so that at least some of adapter 135 is secured by the institution. Financial integration adapter 135 allows system 100 to report transactions to user 105, and to receive responses from user 105 without storing actual credit card numbers, account numbers, etc. Instead, the financial integration adapter 135 allows for generating a unique identifier that cloaks the account number information, but which may still be used to identify the transaction. The identifier may be encrypted, and stored in a memory of system 100.

For example, the unique identifier may include information indicative of a partial account number (e.g., the last four digits of the account number), so that user 105 may easily identify the particular account, without storing the entire account number. Alternately, the unique identifier may comprise a random GUID (guaranteed unique user ID). Storing an identifier different than the actual account number may substantially improve the security of system 100.

In some embodiments, financial integration adapter 135 may also enable legacy systems to capture transactions from the legacy system to financial integration adapter 135. Financial integration adapter 135 may also implement an inherent transaction filter. With an inherent transaction filter, transaction information may be filtered as part of adapter 135, before transmission from the financial institutions. Financial institutions need only send transaction information (e.g., name, card identifier, vendor information, transaction amount, date and time) for consumers who are enrolled in system 100. In the absence of an inherent transaction filter, transaction information for each transaction at the financial institution may need to be sent. Further, by distributing the rule service (e.g., implementing at least some rule functionality at adapter 135), alerts may be sent only for some enrolled users/transactions. Thus, the number of transactions outbound from financial institutions may be significantly reduced.

As noted above, transaction information may be provided to user 105 using transaction alert system 125, either via financial integration adapter 135, or directly. The inbound transaction is cross-referenced to identify the financial instrument information (e.g., user account information and credit card information).

Transaction alert system 125 may implement a number of user-specified rules. Rules may be implemented differently for different financial instruments (e.g., for different credit cards, or for different account types), or some rule sets may be used for more than one financial instrument. Therefore, user 105 is able to customize system 100 for his or her particular financial situation.

The user-specified rules may include vendor-specific rules, vendor-type rules, geographic rules, transaction profile rules, and/or other rules. The user-specified rules may also detail the method by which user 105 is notified of the transaction (e.g., by cell phone, e-mail, pager, and/or other method), and may also govern notification timing (e.g., send all notifications upon processing of transaction information, send some notifications daily, and the like).

Some example rules are as follows:
Vendor Specific Rules
   Always trust this vendor regardless of the transaction amount Trust this vendor if the transaction amount is included in a range
Trust this vendor only for transactions of a distinct amount
Trust this vendor for a distinct amount on a specific date
Trust this vendor if the transaction amount is included in a range, on a specific date
Transaction Profile Rules
Send notification if multiple transactions from the same vendor within particular time interval
Send notification if more than a minimum number of transactions in a predetermined time interval
Geographic Rules
Send notification if transaction outside particular geographic area (e.g., using a zip code/area code list)
Send notification if transaction is within a particular geographic area
Notification Method Rules
Transmit message to cell phone model and cell number
Transmit message to one or more emails
Transmit message to cell first, then list of one or more emails
Send page message
Transmit message via automated phone call Rule-based transaction processing may allow user 105 to limit the received messages to a manageable number so that he is immediately notified of transactions that are suspect, but need not be immediately notified of certain transactions (e.g., expected, repeated transactions such as automatic mortgage payments). That is, a particular user may have fifty transactions on a particular day. However, some of the transactions may be trusted transactions for which the system does not generate an alert. Other transactions may be transactions that are grouped into a single alert (e.g., trusted transactions for which the user selects a daily email and/or cell phone notification).

The user may thus create a rule profile that optimizes the number of received alerts for his particular needs. If the user finds that he is receiving an excessive number of alerts based on his initial rule profile, he may modify the rule profile to reduce the number of received alerts. Similarly, if the user determines that he would like to receive more alerts (for example, to increase the security of his financial transactions), he can modify his rule profile to send alerts for more transactions.

Transaction information received from institutions 110A and 110B may be processed; combined with response option information and/or alert identification information (such as an alert number and alert time); formatted based on one or more delivery methods; and packaged as an alert message. The alert message may then be communicated to user 105 via one or more selected communication methods.

Upon receipt, user 105 may respond to the alert. For example, user 105 may respond to a cell phone text message alert by replying to the text message either confirming the transaction, flagging the transaction for auditing, or denying the transaction. The response may be received in a response system 130. Response system 130 may monitor for response messages (e.g., return e-mails, return cell phone calls, etc.), and reconcile received responses with associated transaction alerts.

Responses may be associated with the corresponding transaction alert and stored in response system 130. If two or more responses associated with the same transaction alert are received, response system 130 may reconcile the multiple responses. For example, response system 130 may react to the first response, the last response, or may implement some other method to reconcile the multiple responses.

Response system 130 may also transmit information to associated institutions to trigger downstream processes based on the response information. For example, institution 110A may receive a communication from system 100 indicating that a particular transaction should be denied. As a result, institution 110A may deny the transaction, and may initiate one or more additional processes, such as associating a global fraud alert with the particular financial instrument, or communicating fraud information to law enforcement.

System 100 may further include a transaction analysis and reporting module 140. Module 140 may store transaction and response information for each transaction, so that consumers may view purchase information, and may reconcile charges rapidly. Module 140 may implement reconciliation rules for particular types of alerts and/or responses.

For example, module 140 may implement rules such as the following exemplary rules:

Trusted transactions: all trusted transactions were filtered and therefore not sent as alerts. Trusted transactions are grouped as trusted, and need not be reviewed.

Verified transactions: all verified transactions are already reconciled and need not be reviewed.

Audit transactions: transactions flagged as audit are grouped together for easy viewing. These transactions may be marked as verified and automatically reconciled, or denied based on the user's review. Note that when a status for a transaction is modified, response system 130 may re-evaluate the transaction, and may take further action.

Denied transactions: transactions that were denied appear together for easy viewing. The information may be used to assist financial underwriters in recovering loss or preventing further fraud. The status of denied transactions may be changed if the status was incorrect, or if new information becomes available.

System 100 may further provide financial transaction information in a format to be used by programs such as Quicken and Microsoft Money. System 100 may incorporate a flat file template processor to import transactions from other sources. The user may thus get a truly global view of his or her financial transaction activity.

Figure 2:
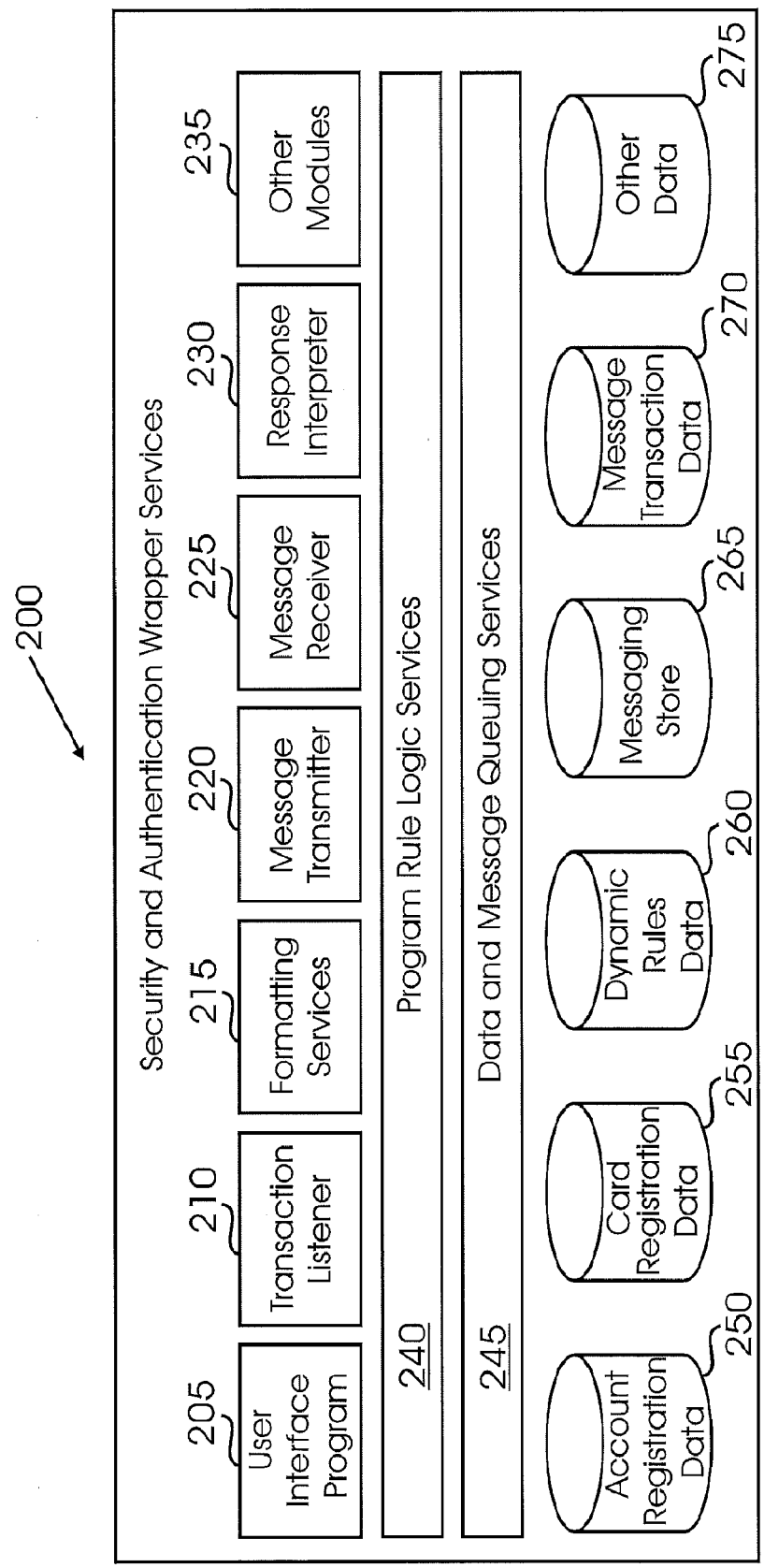
FIG. 2 is a diagram of an information system for a secure transaction system.

FIG. 2 shows a schematic of an information system 200 for a secure transaction system, according to some embodiments. System 200 comprises data and instructions to implement the functionality illustrated in FIG. 3 and described below, which may be stored on one or more machine-readable media (e.g., one or more memory modules) and may be executed by one or more processors (e.g., one or more microprocessors).

System 200 includes a user interface program 205. User interface program 205 includes data and instructions to generate user interface data so that a user can interact with system 200. For example, the user interface data may be transmitted to a user system, and cause the user system to display one or more graphical user interfaces (GUIs). In response, the user can select items on the GUI, so that response data is provided to system 200. User interface program 205 is used to facilitate user interaction with system 200; for example, user enrollment, user information acquisition, and the like.

User interaction may comprise a number of activities. For example, a user may interact with system 200 via one or more GUIs to enroll in the security and authentication system. A user may register one or more credit cards with system 200, may register one or more financial accounts with system 200, or may register one or more other financial instruments with system 200 (e.g., debit cards, stock accounts, or other financial instruments). A user may also interact with system 200 to select, develop, and/or modify transaction processing rules.

System 200 may include a transaction listener 210. Transaction listener 210 may receive transaction data from a plurality of financial entities. For example, transaction listener 210 may receive transaction data transmitted by a first financial entity of the plurality of financial entities based on execution of a transaction on an information system of the first financial entity. The transmitted data may include data indicative of a financial instrument identifier (e.g., indicative of a credit card number), data indicative of a transaction type (e.g., purchase), data indicative of a transaction description (e.g., vendor information for a purchase), data indicative of a transaction amount, and/or other data.

In another example, transaction listener 210 may receive transaction data in response to polling a plurality of financial entities. In response, the financial entities may transmit transaction data for recent transactions to transaction listener 210.

System 200 may further include formatting services 215. Formatting services 215 may receive transaction data from transaction listener 210, determine an associated financial instrument using card registration data 255, and determine an associated user using account registration data 250. Formatting services 215 may format the transaction data to transmit related information to the associated user, according to one or more rules included in dynamic rules data 260 and implemented by program rule logic services 240. For example, formatting services 215 may format the transaction data to be transmitted to a particular cell phone type using account registration data 250.

For example, formatting services 215 may receive data indicative of a credit card purchase transaction for a particular user. Formatting services 215 may generate an email notification for the particular user, including identification information for the credit card (such as a truncated credit card number), the date, time, vendor identification, transaction amount, and/or other transaction information. System 200 may store messaging information in messaging store 265, as well as storing message transaction data 270.

System 200 may transmit transaction information to the user using a message transmitter 220, where the transmission may be coordinated using data and message queuing services 245.

When the user receives the alert, the user may take a number of actions. The user may approve the transaction, may deny the transaction, may flag the transaction for audit, or may take another action. The user may transmit a response to system 200, which is received by message receiver 225, and interpreted by response interpreter 230 (for example, using configuration information for the user's cell phone, email, and the like).

System 200 may include other modules; for example, a transaction data formatting module to format transaction data to be used by external programs, such as Quicken, Microsoft Money, or other program. System 200 may further store other data 275.

Figure 3:
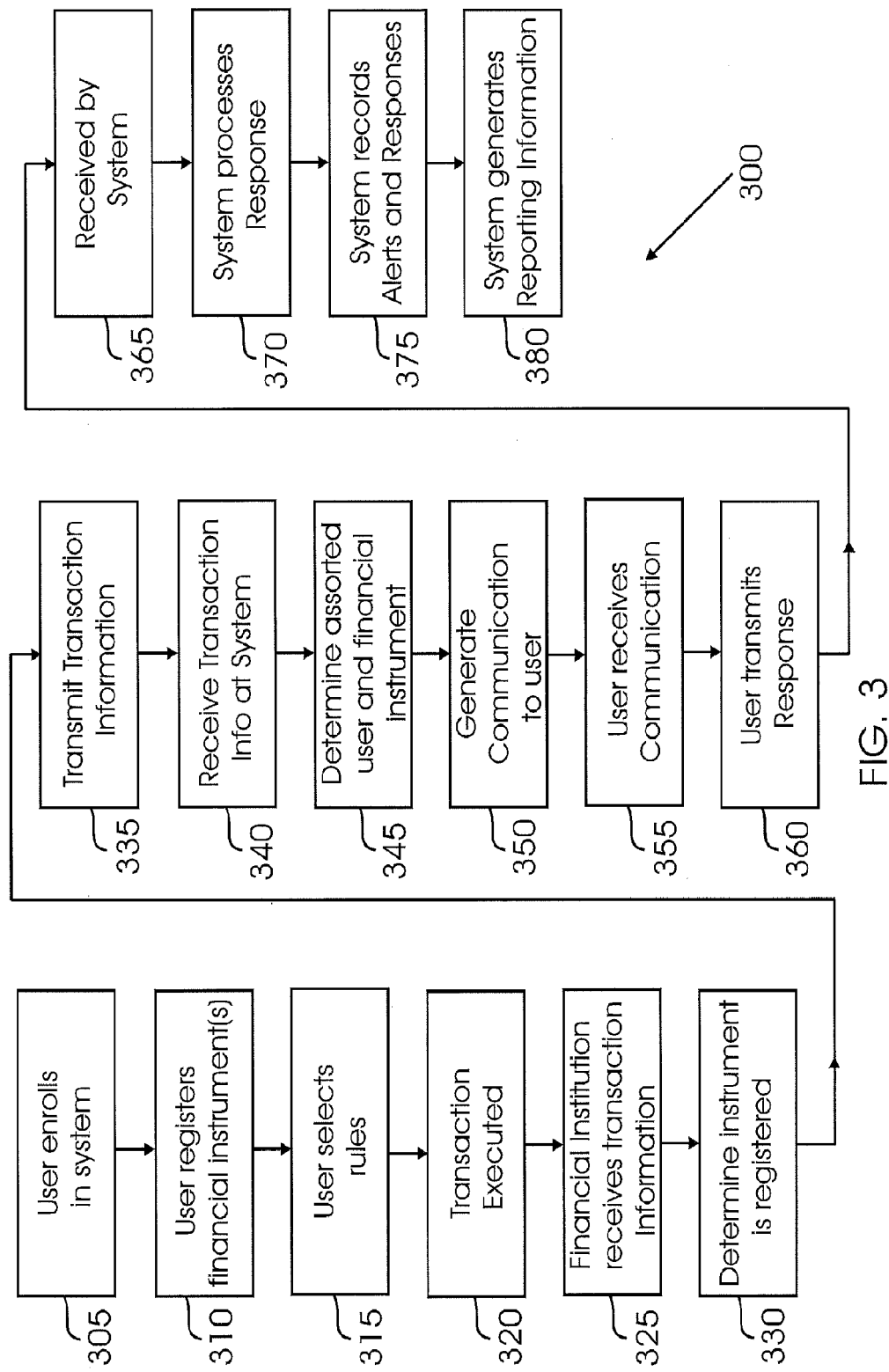
FIG. 3 is a flow chart illustrating a method for reducing fraud in financial transactions.

FIG. 3 shows a security and authentication process 300 that may be used, in some embodiments. At 305, a user may enroll in an authentication system such as the systems described above. At 310, a user may register one or more financial instruments with the authentication system.

In some embodiments, a user may access the authentication system to register one or more financial instruments (for example, a user may register a credit card via an Internet browser). In other embodiments, the user may register the financial instruments in the authentication system via the associated financial institution. For example, a bank may offer customers the option of authentication system registration for each account, credit card, and the like. The registration process may then be negotiated by the authentication system and financial institution.

At 315, the user may generate and/or select one or more rules to govern alert handling for one or more financial instruments. The authentication system may present a number of pre-defined rules to the user, who may select individual rules or collections of rules (rule profiles). The user may generate rules using one or more pre-defined rule portions.

At 320, a transaction may be executed using a registered financial instrument. At 325, the associated financial institution (or other party) may receive transaction information for transaction. The financial institution may determine that the financial instrument is registered at 330, and may transmit transaction information to the authentication system at 335.

At 340, the authentication system may receive transaction information. At 345, the authentication system may determine an associated user and associated financial instrument based on the received information. At 350, the authentication system may generate one or more communications to the associated user, according to the pre-selected rules for the financial instrument.

At 355, the user may receive one or more communications. At 360, the user may transmit a response to at least one of the communications, which may be received by the authentication system at 365.

At 370, the authentication system may process the response, and may take one or more actions based on the response. For example, the authentication system may communicate the response to the financial institution for further action (e.g., notifying authorities, placing a fraud alert on the particular financial instrument). At 375, the system may reconcile alerts and responses, and at 380 may generate reporting information for the user.

In implementations, the above described techniques and their variations may be at least partially implemented as computer software instructions. Such instructions may be stored on one or more machine-readable storage media or devices and are executed by, e.g., one or more computer processors, or cause the machine, to perform the described functions and operations.

A number of implementations have been described. Although only a few implementations have been disclosed in detail above, other modifications are possible, and this disclosure is intended to cover all such modifications, and most particularly, any modification which might be predictable to a person having ordinary skill in the art.

Also, only those claims which use the words "means for" are intended to be interpreted under 35 USC 112, sixth paragraph. Moreover, no limitations from the specification are intended to be read into any claims, unless those limitations are expressly included in the claims. Accordingly, other embodiments are within the scope of the following claims.

The invention claimed is:

1. A machine-implemented method comprising:
Receiving, by a processor, transaction information for N financial transactions, each said financial transaction having already been executed using an associated financial instrument;
processing, by the processor, the transaction information using at least one of a plurality of rule sets, each said rule set being associated with a respective one of the financial instruments;
selectively, by the processor, generating M alert communications in response to the processing, wherein each said alert communication identifies one of the N financial transactions, and wherein M is less than N;

passing, by the processor, the alert communications to an entity over a network, wherein each said alert communication is configured to permit the entity to optionally reply directly to the respective alert communication, wherein the receiving, processing, generating, and passing are performed by a transaction alert system after the N financial transactions have already been executed and without interfering with execution of the N financial transactions;

receiving, by the processor, at least one response message from the entity at a response system in direct reply to the alert communications after the N financial transactions have been executed and without interfering with the execution of the N financial transactions, wherein the response messages from the entity include designations provided by the entity concerning the financial transactions; and wherein the execution of the financial transactions are not conditioned on the designations included in the response messages.

2. The method of claim 1, wherein the designations are selected by the entity from a set of possible designations comprising at least a confirm designation and a deny designation.

3. The method of claim 1, wherein:
the receiving transaction information comprises receiving the transaction information from a financial institution;
the alert communications do not require the entity to directly contact the financial institution to provide the response messages; and
the method further comprises informing the financial institution of the response messages, wherein the informing is performed by the response system.

4. The method of claim 1, wherein the designations are selected by the entity from a set of possible designations comprising at least a confirm designation, a flagged designation, and a deny designation.

5. The method of claim 1, wherein the one rule set comprises a vendor-specific rule, a vendor-type rule, a geographic rule, or a transaction profile rule.

6. The method of claim 1, wherein each said financial instrument is associated with a different financial institution.

7. The method of claim 1, wherein the entity is a user, and the generating the M alert communications comprises generating one of the alert communications based on user device configuration information indicative of at least one of a cell phone type and/or an email type associated with the user.

8. The method of claim 1, wherein the transaction information comprises purchase information and withdrawal information, one of the financial instruments is a credit card, and another one of the financial instruments is a debit card.

9. A system comprising:
a non-transitory memory configured to store a plurality of rule sets each associated with a respective financial instrument;
a transaction alert system comprising a processor configured to:
receive transaction information for N financial transactions, each said financial transaction having already been executed using one of the financial instruments;
process the transaction information using the rule sets associated with the respective financial instruments;
selectively generate M alert communications in response to the processing, wherein each said alert communication identifies one of the N financial transactions, and wherein M is less than N;
pass the alert communications to an entity over a network, wherein each said alert communication is configured to permit the entity to optionally reply directly to the respective alert communication, and
perform the receive, process, generate, and pass operations after the N financial transactions have already been executed and without interfering with execution of the N financial transactions;
a response system configured to receive at least one response message in direct reply to the alert communications after the N financial transactions have been executed and without interfering with the execution of the N financial transactions, wherein the response messages from the entity include designations provided by the entity concerning the financial transactions; and
wherein the execution of the financial transactions are not conditioned on the designations included in the response messages.

10. The system of claim 9, wherein the designations are selected by the entity from a set of possible designations comprising at least a confirm designation and a deny designation.

11. The system of claim 9, wherein:
the transaction information is received from a financial institution;
the alert communications do not require the entity to directly contact a financial institution to provide the response messages; and
the response system is further configured to inform the financial institution of the response messages.

12. The system of claim 9, wherein the designations are selected by the entity from a set of possible designations comprising at least a confirm designation, a flagged designation, and a deny designation.

13. The system of claim 9, wherein one of the rule sets comprises a vendor-specific rule, a vendor-type rule, a geographic rule, or a transaction profile rule.

14. The system of claim 9, further comprising another memory configured to store the response message.

15. The system of claim 9, wherein each said financial instrument is associated with a different financial institution.

16. A machine-implemented method comprising:
receiving, by a processor, M alert communications at a device, wherein:
the alert communications identify N financial transactions and are configured to permit an entity to optionally reply directly to the alert communications using the device,
the M alert communications are received in response to a rule-based process performed on transaction information associated with the N financial transactions, and
the rule-based process uses a plurality of rule sets associated with a plurality of financial instruments to selectively generate the M alert communications, wherein each said financial transaction has already been executed using a respective one of the financial instruments, and M is less than N;
receiving, by the processor, input from the entity in response to the M alert communications without interfering with the execution of the N financial transactions;
generating, by the processor, at least one response message in direct reply to the M alert communications based on the input;
wherein the response messages from the entity include designations provided by the entity concerning the financial transactions;

wherein execution of the financial transactions are not conditioned on the designations included in the response messages; and wherein the method is performed by one or more processors configured to execute software instructions which, when executed by the one or more processors, cause the device to perform the method after the financial transactions have already been executed and without interfering with the execution of the financial transactions.

17. The method of claim 16, wherein the designations are selected by the entity from a set of possible designations comprising at least a confirm designation and a deny designation.

18. The method of claim 16, wherein the alert communications do not require the entity to directly contact a financial institution to provide the response messages.

19. The method of claim 16, wherein the designations are selected by the entity from a set of possible designations comprising at least a confirm designation, a flagged designation, and a deny designation.

20. The method of claim 16, wherein one of the alert communications is a cell phone text message, an email, or a voice message.

21. The method of claim 16, wherein one of the rule sets comprises a vendor-specific rule, a vendor-type rule, a geographic rule, or a transaction profile rule.

22. The method of claim 16, wherein each financial instrument is associated with a different financial institution.

23. A device comprising:

one or more processors configured to execute software instructions in a non-transitory memory which, when executed by the one or more processors, cause the device to perform a method comprising:

receiving M alert communications at the device, wherein:

the alert communications identify N financial transactions and are configured to permit an entity to optionally reply directly to the alert communications using the device, the M alert communications are received in response to a rule-based process performed on transaction information associated with the N financial transactions, and the rule-based process uses a plurality of rule sets associated with a plurality of financial instruments to selectively generate the M alert communications, wherein each said financial transaction has already been executed using a respective one of the financial instruments, and M is less than N; and receiving input from the entity in response to the M alert communications without interfering with the execution of the N financial transactions;

generating a response message in direct reply to the M alert communications based on the input;

wherein the response messages from the entity include designations provided by the entity concerning the financial transactions;

wherein execution of the financial transactions are not conditioned on the designations included in the response messages; and wherein the device is configured to perform the method after the financial transactions have already been executed and without interfering with the execution of the financial transactions.

24. The device of claim 23, wherein the designations are selected by the entity from a set of possible designations comprising at least a confirm designation and a deny designation.

25. The device of claim 23, wherein the alert communications do not require the entity to directly contact a financial institution to provide the response messages.

26. The device of claim 23, wherein the designations are selected by the entity from a set of possible designations comprising at least a confirm designation, a flagged designation, and a deny designation.

27. The device of claim 23, wherein one of the rules comprises a vendor-specific rule, a vendor-type rule, a geographic rule, or a transaction profile rule.

28. The device of claim 23, wherein each financial instrument is associated with a different financial institution.

29. The device of claim 23, wherein the generating the M communication comprises formatting one of the alert communications based on user device configuration information indicative of at least one of a cell phone type and/or an email type associated with a user of the device.

* * * * *